United States Patent
Kline et al.

[11] Patent Number: 5,939,160
[45] Date of Patent: Aug. 17, 1999

[54] LOW ODOR PERMEABLE HOSE

[75] Inventors: Sally A. Kline, North Ridgeville; William J. Friedman, Wooster, both of Ohio

[73] Assignee: SeaLand Technology, Inc., Big Prairie, Ohio

[21] Appl. No.: 08/805,803

[22] Filed: Feb. 25, 1997

[51] Int. Cl.⁶ ..................................................... B29D 22/00
[52] U.S. Cl. .................. 428/36.9; 428/36.6; 428/36.91; 524/567; 524/569; 138/118
[58] Field of Search ................... 428/36.6, 36.8, 428/36.9, 36.91; 138/118; 524/567, 569; 73/40.7

[56] References Cited

U.S. PATENT DOCUMENTS

| | | | |
|---|---|---|---|
| 3,599,677 | 8/1971 | O'Brien | 138/122 |
| 3,936,417 | 2/1976 | Ronden . | |
| 5,030,690 | 7/1991 | Fujita et al. | 525/80 |
| 5,055,415 | 10/1991 | Backderf | 524/533 |
| 5,139,655 | 8/1992 | Sigler . | |
| 5,157,076 | 10/1992 | Greenlee et al. | 525/83 |
| 5,326,602 | 7/1994 | Rifi | 428/35.7 |
| 5,380,786 | 1/1995 | Greenlee et al. | 524/560 |
| 5,442,952 | 8/1995 | Morris et al. | 73/40.7 |

FOREIGN PATENT DOCUMENTS

| | | |
|---|---|---|
| 57-070149 | 4/1982 | Japan . |
| 62-041233 | 2/1987 | Japan . |
| 62-057443 | 3/1987 | Japan . |
| 4164913 | 6/1992 | Japan . |
| 8504506 | 5/1996 | Japan . |

*Primary Examiner*—Ellis Robinson
*Assistant Examiner*—Jennifer M. Hayes
*Attorney, Agent, or Firm*—Nixon & Vanderhye P.C.

[57] ABSTRACT

Flexible PVC hose can be used with toilet systems in vehicles, such as boats, recreational vehicles, etc, or at pumpout stations. The hose includes about 40–55% by weight PVC resin, and at least 10% by weight of an EVA high molecular weight plasticizer. The hose also typically includes a low molecular weight plasticizer, stabilizer, lubricant, filler (such as 5–20% by weight dense filler like calcium carbonate), and pigment. The hose typically will not fail (that is will not transmit odor) for the life of the toilet system, or mechanical life of the hose.

19 Claims, 1 Drawing Sheet

Fig. 1
PRIOR ART
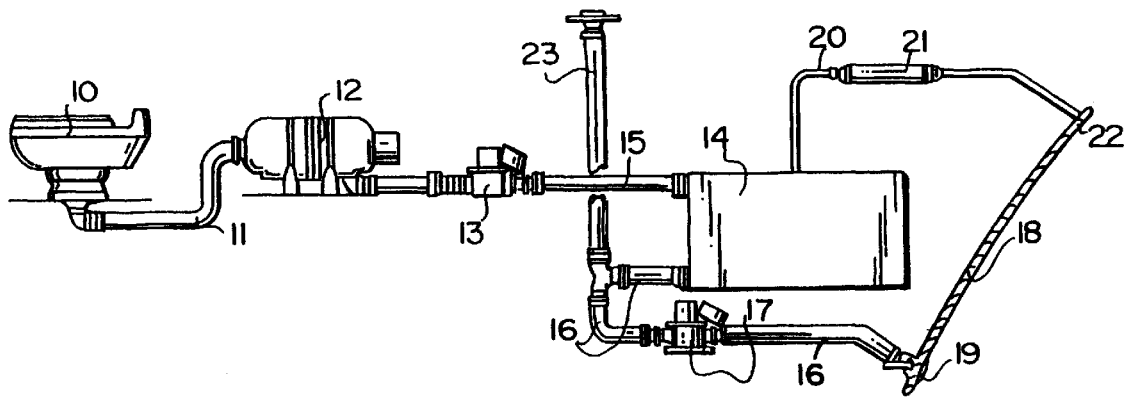
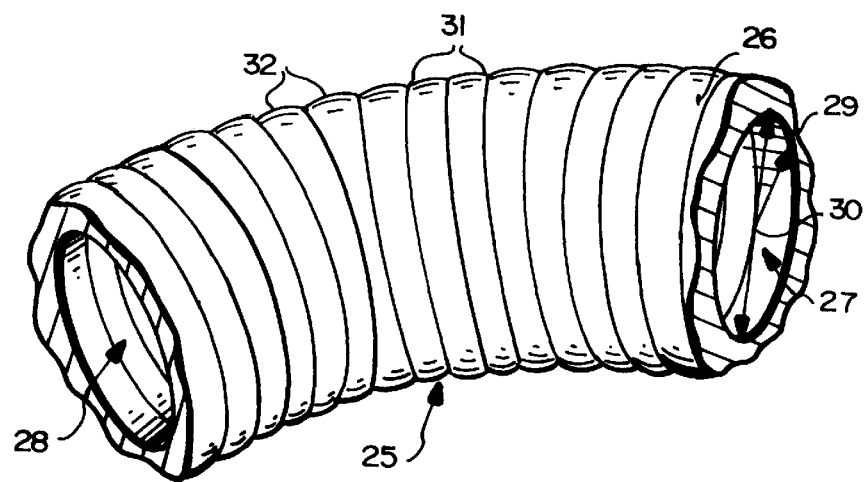
Fig. 2

LOW ODOR PERMEABLE HOSE

BACKGROUND AND SUMMARY OF THE INVENTION

For decades one of the major problems associated with toilet systems for vehicles, such as boats, recreational vehicles, and the like, has been the relatively rapid failure of flexible hoses associated with said systems as far as the transmission of noxious odors are concerned. The flexible, typically PVC, hose associated with these toilet systems are sometimes in contact with sewage, particularly in adverse environments (such as tropical climates) for extended periods of time. In many circumstances the hose can fail in as little as three to six months in actual use, and when it does fail the noxious odors that it transmits can make the vehicle essentially unusable until the hose is replaced (the hose typically cannot be purged once it has failed).

It is because of the very significant practical problem that exists with such hoses that SeaLand Technology, Inc. of Big Prairie, Ohio has developed a testing procedure for hoses made of various materials to—in an accelerated manner—see if they can be expected to have a long life in the field, e.g. so that essentially hoses never have to be replaced because of odor permeation and transmission but only if they fail mechanically or the toilet system itself is replaced.

The term "SeaLand Sanitation Hose Permeability Test" as used in the present specification and claims means the test such as described in U.S. Pat. No. 5,442,952 (the disclosure of which is hereby incorporated by reference herein) in which the hose is first treated by introducing methyl alcohol into the hose sample and allowing the alcohol to stand for a day or more. Then one introduces into the hose sample (sealed at its ends, and with a barrier around it) a combination of dimethyl sulfide, carbon disulfide, and dimethyl disulfide. The sample is kept at about room temperature (e.g. about 72° F.) and the sealed area around the hose is sensed for carbon disulfide. When a level of about 3 ppm carbon disulfide is sensed in the sealed volume surrounding the hose then it is considered that the hose has failed.

While literally dozens of hoses have been tested utilizing the SeaLand Sanitation Hose Permeability Test, until the invention the only hose that had acceptable odor transmission-resistant characteristics was one recently available from Australian Global Services Inc. of Perrysville, Ohio under the trade name AVS96 Marine Sanitation Hose. Conventional flexible PVC hose for vehicle toilet systems, when tested using the SeaLand Sanitation Hose Permeability Test, typically experiences hose failure in about two days (even though in real life situations the quickest failures are typically about three to six months). While it is not known whether there is a linear relationship between the failure under the SeaLand Sanitation Hose Permeability Test conditions and real life conditions, it is desired that in order to be relatively sure that a hose will not fail (that is transmit odors, particularly carbon disulfide) over its normal expected life in real life situations, it should not fail the SeaLand Sanitation Hose Permeability Test for at last eight days, and preferably for at least 12 days or more.

The AVS96 hose typically will not fail the SeaLand Sanitation Hose Permeability Test for eight days or more. While the AVS96 hose is the first hose to be successful from the odor permeation standpoint, for marine toilet system applications, it is very expensive, and its odor transmission resistance is not ideal. The formulation of the AVS96 hose is maintained as a trade secret by its manufacturer. While the AVS96 hose has been evaluated to determine its chemical constituents, those constituents cannot be precisely determined by reverse engineering, but it is believed that they comprise PVC with a low molecular weight plasticizer and a nitrile high molecular weight plasticizer.

By aggressively employing the testing methods of U.S. Pat. No. 5,442,952 to existing hoses, and instituting intense development work for new hose materials, the flexible hose odor transmission failure problem for a vehicle toilet system that has existed for decades has finally been cost effectively, and with a large margin or error, solved. According to the present invention a new hose formulation has been developed which is of lower cost than the AVS96 hose, and does not fail the SeaLand Sanitation Hose Permeability Test for a longer time than the AVS96 hose; that is it does not fail the test for at least eight days, and typically does not fail for thirteen days or more. The construction according to the present invention uses ethylene-vinyl-acetate (EVA) copolymer as the high molecular weight plasticizer, that copolymer having very poor carbon disulfide solubility. While EVA is known as a plasticizer for PVC for some products such as pool liners, water bed envelopes, or the like, significant amounts of EVA have not been heretofore known in the construction of unreinforced flexible hose, particularly for sewage transmission purposes.

According to one aspect of the present invention a vehicle toilet system is provided comprising: A toilet and a sewage holding tank mounted in a vehicle. And, a flexible hose for carrying sewage and operatively connected to at least one of the toilet and tank. The flexible hose comprising polyvinyl chloride, low molecular weight plasticizer, stabilizer, lubricant, and sufficient EVA high molecular weight plasticizer (which has poor carbon disulfide solubility) so that the hose will not fail the SeaLand Sanitation Hose Permeability Test for at least thirteen days. According to the preferred embodiment of the present invention the high molecular weight plasticizer comprises at least 10% by weight EVA copolymer, and more preferably at least 30% by weight EVA copolymer. The hose typically also contains filler and pigment. For example the hose may comprise, or consist essentially of, by weight, about 40–55% PVC resin, about 30–40% ethylene-vinyl-acetate copolymer, about 2–30% low molecular weight plasticizer, about 1–20% filler, and about 0.5–5% each of stabilizer and pigment, and about 0.05–0.5% lubricant. Even more EVA may be utilized to provide an even higher resistance to odor permeability, however EVA is relatively expensive and more than 40% is not necessary in order to, as a practical matter, achieve the desired results according to the invention. However should the EVA polymer price significantly decrease, or should particularly adverse environmental conditions for use of the flexible develop, more EVA can be used.

According to another aspect of the present invention a flexible hose per se is provided which comprises: An unreinforced tubular body capable of bending to form a radius and comprising: at least about 40% by weight PVC resin; at least about 10% by weight ethylene-vinyl-acetate copolymer; and low molecular weight plasticizer. The hose typically comprises at least about 30% by weight EVA, and typically also contains stabilizer, lubricant, filler and pigment. For example flexible hose according to the invention may consist essentially of, by weight, about 40–55% PVC resin, about 30–40% ethylene-vinyl-acetate copolymer, about 2–30% low molecular weight plasticizer, about 1–20% filler, about 0.5–5% each of stabilizer, and pigment, and about 0.05–0.5% lubricant.

That is the hose according to the invention, may comprise, by weight, at least about 40% PVC resin, at least about 30% ethylene-vinyl-acetate copolymer, at least about 2% low molecular weight plasticizer, at least about 1% filler, at least about 0.5% stabilizer, and at least about 0.05% lubricant. The lower molecular weight plasticizer, filler, stabilizer, lubricant, and—if utilized—pigment, may comprise any suitable conventional materials for that purpose, literally dozens of each of which are available commercially. However in the preferred embodiment of the invention the low molecular weight plasticizer comprises Di-octyl phthalate, the filler comprises calcium carbonate, the stabilizer comprises barium zinc, and the lubricant comprises stearic acid. For example a hose may be provided wherein the low molecular weight plasticizer comprises about 5–10% Di-octyl phthalate, wherein the filler comprises about 5–15% calcium carbonate, wherein the stabilizer comprises about 1–2% barium zinc stabilizer, wherein the lubricant comprises about 0.1–0.2% stearic acid, and further comprising about 1–2% titanium dioxide pigment. For example the flexible hose may consist of PVC, at least 10% by weight EVA, about 5–10% low molecular weight plasticizer, about 5–15% filler, about 1–2% stabilizer, about 0.1–0.2% lubricant, and about 1–2% pigment.

According to another aspect of the present invention a method of operating a toilet system, including a toilet, a sewage holding tank, a flexible hose connecting at least some of the components of the system, or in a pumpout system, is provided. The method comprises the step of: (a) Connecting at least one of the toilet and holding tank to each other and/or to other components of the system, or in a pumpoiut system, using flexible hose comprising polyvinyl chloride, and an EVA high molecular weight plasticizer which has poor carbon disulfide solubility, so that the hose will not fail the SeaLand Sanitation Hose Permeability Test for at least eight days (e.g. preferably for at least 13 days). Step (a) is typically further practiced by utilizing the details of the flexible hose as described above.

It is the primary object of the present invention to provide a relatively low cost flexible hose which will not fail, in the sense of transmitting odors (particularly carbon disulfide), over its expected mechanical life in vehicle toilet systems. This and other objects of the invention will become clear from an inspection of the detailed description of the invention, and from the appended claims.

BRIEF DESCRIPTION OF THE DRAWINGS

FIG. 1 is a schematic illustration of an exemplary vehicle toilet system utilizing the flexible hose according to the present invention; and FIG. 2 is a perspective view of a section of flexible hose according to the present invention.

DETAILED DESCRIPTION OF THE DRAWINGS

A flexible hose according to the present invention may be used in any vehicle toilet system in which flexible hose is utilized. The hose according to the present invention will be described with respect to use in association with a vacuum toilet system, but that is representative of only one of several different types of toilet systems with which a flexible hose according to the invention may be utilized.

In the conventional VACU-FLUSH® system as illustrated in FIG. 1, at least one vacuum toilet 10 having a waste discharge on the bottom thereof is connected by a flexible PVC hose 11 to a vacuum tank 12, and mounted in a vehicle (e.g. boat, RV, caravan, plane, train, or the like). A vacuum level of about 8–10 inches (20–26 cm.) of mercury is maintained in the tank 12 by the vacuum pump 13, a conventional vacuum switch on the tank 12 operating the pump 13 to maintain an appropriate vacuum. When the pump 13 is operated to replenish the vacuum in the vacuum tank 12, sewage is pumped to the holding tank 14 via conduit 15. The sewage ultimately is discharged from the holding tank 14 via conduits 16 perhaps by using an optional sewage discharge pump 17 which is operated only when there is a mechanism for proper disposal of the sewage. The conduits 15, 16 also are preferably flexible PVC hose, and carry sewage.

The exterior partition 18 in FIG. 1 comprises an exterior partition of a boat, recreational vehicle, plane, train, or other vehicle, e.g. simulating the form of boat hull in the actual illustration in FIG. 1. The exterior partition 18 is penetrated by termination 19 of the conduit 16 from the tank 14. When the pump 17 is not used the termination 19 is merely connected up to a pump-out facility at a dock, campsite, terminal, or the like. Conventional valves are provided to preclude sewage from being discharged from the tank 14 into hose 16 unless there is a motive force appropriate for discharging the sewage to a suitable location.

From the holding tank 14 is a conventional vent 20, which may have a suitable filter therein such as shown in U.S. Pat. No. 5,139,655 with an end termination 22 of the conduit 20 penetrating the partition 18 to vent odoriferous gases from the holding tank 14 to the atmosphere. Another conventional vent 23 is typically also provided from the hose 16, typically penetrating another partition (e.g. boat deck) of the vehicle in which the toilet 10 is provided.

An exemplary piece of hose 25 according to the present invention is seen in perspective view in FIG. 2, and may be used for any of the hoses 11, 15, 16, or the like illustrated in FIG. 1, or any other place where a flexible hose is necessary. The hose 25 comprises a preferably unreinforced (no fiberglass or other fiber reinforcements typically being necessary) tubular body 26, typically having open ends 27, 28, and capable of bending to form a radius, as illustrated schematically in FIG. 2. While the thickness 29 of the wall of the tubular body 26 may vary widely, typically it is between about 0.1–0.25 inches (about 0.25–0.65 cm.), e.g. about 0.18 inches (about 0.45 cm). The diameter 30 also may vary widely depending upon the particular use to which the hose 25 is put, but the interior diameter 30 is typically about one to three inches (about 2.5–7.5 cm.), e.g. about 1.5 inches (about 4 cm.). The hose 25 may have a smooth exterior or interior surface configuration, or one or both may be "corrugated" as illustrated in FIG. 5 where there are valleys 31 and peaks 32.

The preferred formulation for the hose 25 according the present invention utilizes EVA as the high molecular weight plasticizer; EVA has exceptionally poor carbon disulfide solubility. Typically at least 10% by weight EVA, and preferably at least 30% by weight EVA, is utilized. Almost any suitable commercially available source of EVA copolymer may be utilized. One known acceptable commercially available form of EVA is sold by Dupont Chemical Company under the trademark "EVALLOY".

The hose 25 of the invention also typically contains the conventional PVC hose components of a low molecular weight plasticizer, a stabilizer, and a lubricant, and also normally uses a pigment. A filler is particularly desirable.

The low molecular weight stabilizer utilized in the hose 25 according to the invention may be any one of dozens of commercially available low molecular weight plasticizers, and typically is in the weight percentage of about 2–30%. The amount of low molecular weight plasticizer used will depend upon how flexible ("soft") it is desired for the hose to be. For a normal use in the vehicle toilet system environment about 5 to 10% low molecular weight plasticizer is provided. One particularly suitable low molecular weight plasticizer, simply because of its ready availability and known desirable properties, that may be utilized is Di-octyl phthalate ("DOP").

A filler is preferred to make the hose cost effective and to help achieve odor impermeability. Since the filler is utilized primarily to reduce cost it must be an inexpensive material that will not otherwise adversely affect the functionality of the flexible hose 25. Many of the literally dozens of commercially available suitable fillers that may be utilized are dense, and if a dense filler is utilized (such as calcium carbonate) that also adds slightly to the resistance to permeability of noxious gases provided by the hose 25. For example about 1–20% (preferably about 5–15%) calcium carbonate or a comparable filler will have a minor contribution to the ability of the hose 25 to resist noxious odor permeability.

For the stabilizer, lubricant, and pigment, any suitable commercially available components may be provided, some examples utilized according to the invention comprising between about 0.5–5% stabilizer (such as barium zinc stabilizer) and pigment (such as titanium dioxide), and typically about 0.1–0.2% lubricant being provided, such as stearic acid.

Two examples of particularly suitable formulations for the hose 25 according to the present invention are as follows:

| COMPOUND | PHR | WT % |
|---|---|---|
| EXAMPLE I | | |
| PVC Resin | 100 | 46.35 |
| BaZn Stabilizer | 2.5 | 1.16 |
| Calcium Carbonate | 25 | 11.59 |
| EVA Polymer | 70 | 32.45 |
| DOP Plasticizer | 15 | 6.95 |
| Stearic Acid Lubricant | 0.25 | 0.12 |
| Titanium Dioxide Pigment | 3 | 1.38 |
| | 215.75 | 100% |
| EXAMPLE II | | |
| PVC | 100 | 44.30 |
| BaZn Stabilizer | 2.5 | 1.11 |
| Calcium Carbonate | 25 | 11.07 |
| EVA Polymer | 70 | 31.01 |
| DOP Plasticizer | 25 | 11.07 |
| Stearic Acid Lubricant | 0.25 | 0.11 |
| Titanium Dioxide Pigment | 3 | 1.33 |
| | 225.75 | 100% |

The material of Example I when tested utilizing the SeaLand Sanitation Hose Permeability Test did not fail typically for at least thirteen days, and sometimes not for as long as seventeen days. The material of Example II, while not as successful as the material of Example I, did not fail the SeaLand Sanitation Hose Permeability Test for at least ten days. The hose of Example II, because it has almost twice as much low molecular weight plasticizer as that of Example I, is significantly more flexible than hoses constructed of the material of Example I, although it would be expected to have less resistance to permeability by carbon disulfide gas.

Hose 25 may be made of the materials of Examples I and II utilizing conventional extruding techniques for the manufacture of PVC hose.

Hose 25 according to the present invention may consist essentially of at least about 40% PVC resin, at least about 10% (preferably at least about 30%) EVA copolymer, at least about 2% low molecular weight plasticizer, at least about 1% filler (preferably 5–15% or 5–20% dense filler such as calcium carbonate), at least about 0.5% each of stabilizer and pigment (e.g. about 0.5–5%), and at least about 0.5% lubricant (e.g. about 0.5–0.5%).

The invention may also be used as flexible hose in a dockside pumpout system for boat holding tanks, such as system being generally described in U.S. Pat. Nos. 4,854,827 and 5,433,163.

It will thus be seen that according to the present invention a vehicle toilet system, and a method of operating a toilet system by connecting at least of the components of the system utilizing flexible hose, have been provided. Also a novel flexible hose, per se, but particularly for use in sewage systems, is also provided. The hose, system, and method according to the present invention provide highly desirable odor transmission-resistant characteristics, so that it may expected that hose according to the present invention will not fail (for odor transmission) for the normal mechanical life of the hose, or the toilet system in which it is utilized.

While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent products, systems, and methods.

What is claimed is:

1. A flexible hose capable of being used for the transfer of sewage comprising:

an unreinforced tubular body capable of bending to form a radius and comprising: at least about 40% by weight PVC resin; at least about 10% by weight ethylene-vinyl-acetate co-polymer; and low molecular weight plasticizer, which hose has poor carbon disulfide solubility, so that said hose will not fail the SeaLand Sanitation Hose Permeability Test for at least eight days.

2. A flexible hose as recited in claim 1 wherein said hose comprises at least about 30% by weight ethylene-vinyl-acetate copolymer, and at least about 2% low molecular weight plasticizer.

3. A flexible hose as recited in claim 1 wherein said hose also contains a stabilizer, lubricant, filler and pigment.

4. A flexible hose as recited in claim 1 wherein said hose also contains 5–20% by weight dense filler.

5. A flexible hose as recited in claim 1 wherein said hose consists essentially of, by weight, about 40–55% PVC resin, about 30–40% ethylene-vinyl-acetate copolymer, about 2–30% low molecular weight plasticizer, about 1–20% filler, about 0.5–5% each of stabilizer, and pigment, and about 0.05–0.5% lubricant.

6. A flexible hose as recited in claim 1 wherein said hose comprises, by weight, at least about 40% PVC resin, at least about 30% ethylene-vinyl-acetate copolymer, at least about 2% low molecular weight plasticizer, at least about 1% filler, at least about 0.5% stabilizer, and at least about 0.05% lubricant.

7. A flexible hose as recited in claim 6 wherein said low molecular weight plasticizer comprises Di-octyl phthalate, wherein said filler comprises calcium carbonate, wherein said stabilizer comprises barium zinc stabilizer, and wherein said lubricant comprises stearic acid.

8. A flexible hose as recited in claim 6 wherein said low molecular weight plasticizer comprises about 5–10% Di-octyl phthalate, wherein said filler comprises about 5–15% calcium carbonate, wherein said stabilizer comprises about 1–2% barium zinc stabilizer, wherein said lubricant comprises about 0.1–0.2% stearic acid, and further comprising about 1–2% titanium dioxide pigment.

9. A flexible hose as recited in claim 6 comprising about 5–10% low molecular weight plasticizer, about 5–15% filler, about 1–2% stabilizer, about 0.1–0.2% lubricant, and about 1–2% pigment.

10. A flexible hose as recited in claim 2 further comprising, by weight, about 5–10% low molecular weight plasticizer, about 5–15% filler, about 1–2% stabilizer, and about 0.1–0.2% lubricant.

11. A flexible hose as recited in claim 1 connected to at least one of a toilet or tank mounted in a vehicle.

12. A flexible hose as recited in claim 1 connected to a pumpout system.

13. A flexible hose as recited in claim 1 having a wall thickness of between about 0.25–0.65 cm, and an interior diameter of about 2.5–7.5 cm.

14. A flexible hose as recited in claim 2 having a wall thickness of between about 0.25–0.65 cm, and an interior diameter of about 2.5–7.5 cm.

15. A flexible hose capable of being used for the transfer of sewage comprising:

a tubular body capable of bending to form a radius and comprising: at least about 40% by weight PVC resin; at least about 30% by weight ethylene-vinyl-acetate copolymer; at least about 2% low molecular weight plasticizer; and which has poor carbon disulfide solubility, so that said hose will not fail the SeaLand Sanitation Hose Permeability Test for at least eight days.

16. A flexible hose as recited in claim 15 having a wall thickness of between about 0.25–0.65 cm, and an interior diameter of about 2.5–7.5 cm.

17. A flexible hose as recited in claim 15 connected to at least one of a toilet or tank mounted in a vehicle.

18. A flexible hose as recited in claim 17 wherein said hose will not fail the SeaLand Sanitation Hose Permeability Test for at least thirteen days.

19. A flexible hose capable of being used for the transfer of sewage comprising:

an unreinforced tubular body capable of bending to form a radius and comprising: at least about 40% by weight PVC resin; at least about 30% by weight ethylene-vinyl-acetate copolymer; and at least 2% low molecular weight plasticizer; said hose having poor carbon disulfide solubility, so that said hose will not fail the SeaLand Sanitation Hose Permeability Test for at least thirteen days.

* * * * *